(12) United States Patent
Windmark et al.

(10) Patent No.: US 10,671,881 B2
(45) Date of Patent: Jun. 2, 2020

(54) IMAGE PROCESSING SYSTEM WITH DISCRIMINATIVE CONTROL

(71) Applicant: Microsoft Technology Licensing, LLC, Redmond, WA (US)

(72) Inventors: Johan Windmark, Lund (SE); Gustav Träff, Sandby (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 15/485,224

(22) Filed: Apr. 11, 2017

(65) Prior Publication Data

US 2018/0293460 A1  Oct. 11, 2018

(51) Int. Cl.
*G06K 9/62* (2006.01)
*G06K 9/00* (2006.01)

(52) U.S. Cl.
CPC ......... *G06K 9/6206* (2013.01); *G06K 9/0055* (2013.01); *G06K 9/621* (2013.01); *G06K 9/6212* (2013.01); *G06K 9/6215* (2013.01); *G06K 9/623* (2013.01); *G06K 2009/6213* (2013.01)

(58) Field of Classification Search
None
See application file for complete search history.

(56) References Cited

U.S. PATENT DOCUMENTS

| | | | |
|---|---|---|---|
| 6,445,832 B1 | 9/2002 | Lee et al. | |
| 9,087,384 B2 | 7/2015 | Holeva et al. | |
| 9,224,060 B1 | 12/2015 | Ramaswamy | |
| 9,704,231 B1 | 7/2017 | Kulewski et al. | |
| 10,297,026 B1 | 5/2019 | Jordan et al. | |
| 2003/0137506 A1 | 7/2003 | Efran et al. | |
| 2004/0133927 A1 | 7/2004 | Sternberg et al. | |
| 2005/0052452 A1 | 3/2005 | Baumberg | |
| 2006/0228002 A1 | 10/2006 | Zitnick et al. | |
| 2007/0140582 A1 | 6/2007 | Chen et al. | |
| 2008/0247599 A1 | 10/2008 | Porikli et al. | |
| 2008/0317123 A1 | 12/2008 | Kim et al. | |
| 2010/0002910 A1 | 1/2010 | Delashmit et al. | |
| 2010/0014780 A1* | 1/2010 | Kalayeh | G06T 1/00 382/284 |

(Continued)

FOREIGN PATENT DOCUMENTS

| | | |
|---|---|---|
| EP | 2386998 A1 | 11/2011 |
| EP | 3118814 A1 | 1/2017 |

(Continued)

OTHER PUBLICATIONS

"Non Final Office Action Issued in U.S. Appl. No. 15/691,008", dated Nov. 6, 2018, 20 Pages.

(Continued)

*Primary Examiner* — David Perlman

(57) ABSTRACT

An image processing apparatus is described comprising a processor configured to access a template of image elements. The processor is configured to search an image which is larger than the template to find a region which is similar to the template, where similarity is measured using a similarity metric. The similarity metric comprises a normalized cross correlation function which is modified to include at least one factor related to a statistic of both the template and the region.

20 Claims, 9 Drawing Sheets

(56) References Cited

U.S. PATENT DOCUMENTS

| | | | |
|---|---|---|---|
| 2010/0073502 A1* | 3/2010 | An | H04N 5/232 348/222.1 |
| 2010/0166262 A1 | 7/2010 | Wedge | |
| 2010/0284614 A1 | 11/2010 | Xu et al. | |
| 2010/0321540 A1* | 12/2010 | Woo | G06T 19/006 348/241 |
| 2011/0122131 A1 | 5/2011 | Bruls et al. | |
| 2012/0069007 A1 | 3/2012 | Pegg et al. | |
| 2013/0148721 A1 | 6/2013 | Chen et al. | |
| 2013/0336551 A1* | 12/2013 | Clingman | A61B 5/0095 382/128 |
| 2014/0098089 A1 | 4/2014 | Sutou | |
| 2014/0205141 A1 | 7/2014 | Gao et al. | |
| 2015/0098645 A1 | 4/2015 | Leung | |
| 2015/0363641 A1 | 12/2015 | Navulur | |
| 2016/0050465 A1 | 2/2016 | Zaheer et al. | |
| 2016/0163064 A1 | 6/2016 | Ruf et al. | |
| 2016/0335780 A1 | 11/2016 | Tsuji | |
| 2016/0360226 A1 | 12/2016 | Fishwick et al. | |
| 2017/0011520 A1 | 1/2017 | Mathew et al. | |
| 2017/0208292 A1 | 7/2017 | Smits | |
| 2018/0096516 A1 | 4/2018 | Luebke et al. | |

FOREIGN PATENT DOCUMENTS

| | | |
|---|---|---|
| JP | 2016186793 A | 10/2016 |
| KR | 20130105542 A | 9/2013 |

OTHER PUBLICATIONS

Fekir, et al., "Fast Active Contour for Object Tracking in Image Sequence", In Proceedings of IEEE/ACS 11th International Conference on Computer Systems and Applications, Nov. 10, 2014, pp. 184-189.

Normand, et al., "3D Localization of Electrophysiology Catheters from a Single x-ray Cone-beam Projection", In Journal of Medical Physics, vol. 42, Issue 10, Sep. 30, 2015, pp. 6112-6124.

"International Search Report and Written Opinion Issued in PCT Application No. PCT/US18/025774", dated Jun. 22, 2018, 12 Pages.

"Non Final Office Action Issued in U.S. Appl. No. 15/691,008", dated Aug. 23, 2019, 24 Pages.

"Final Office Action Issued in U.S. Appl. No. 15/691,008", dated Mar. 18, 2019, 24 Pages.

* cited by examiner

IMAGE PROCESSING SYSTEM WITH DISCRIMINATIVE CONTROL

BACKGROUND

Image processing systems for processing videos, web camera images, depth images, medical images and the like are used for a variety of purposes, such as robotic control, scene reconstruction, surveillance, object tracking, gesture recognition, medical image analysis and others. Often the image processing system incorporates a facility to match a template (such as a small region of pixels or voxels) to an image, such as where the template depicts an object and it is desired to find a region of the image which matches the template. Once the template and matching region are known these may be used for a variety of purposes such as to track motion of the depicted object, to join two or more images together to create a composite image depicting a panorama for example, to facilitate stereo matching for depth computation and others. Existing methods of template matching perform poorly in many situations.

Image processing systems often operate in real time such as where they are used for robotic control, object tracking, gesture recognition and other applications. This means that template matching is to be performed as quickly and as efficiently as possible.

The embodiments described below are not limited to implementations which solve any or all of the disadvantages of known image processing systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An image processing apparatus is described comprising a processor configured to access a template of image elements. The processor is configured to search an image which is larger than the template to find a region which is similar to the template, where similarity is measured using a similarity metric. The similarity metric comprises a normalized cross correlation function which is modified to include at least one factor related to a statistic of both the template and the region.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
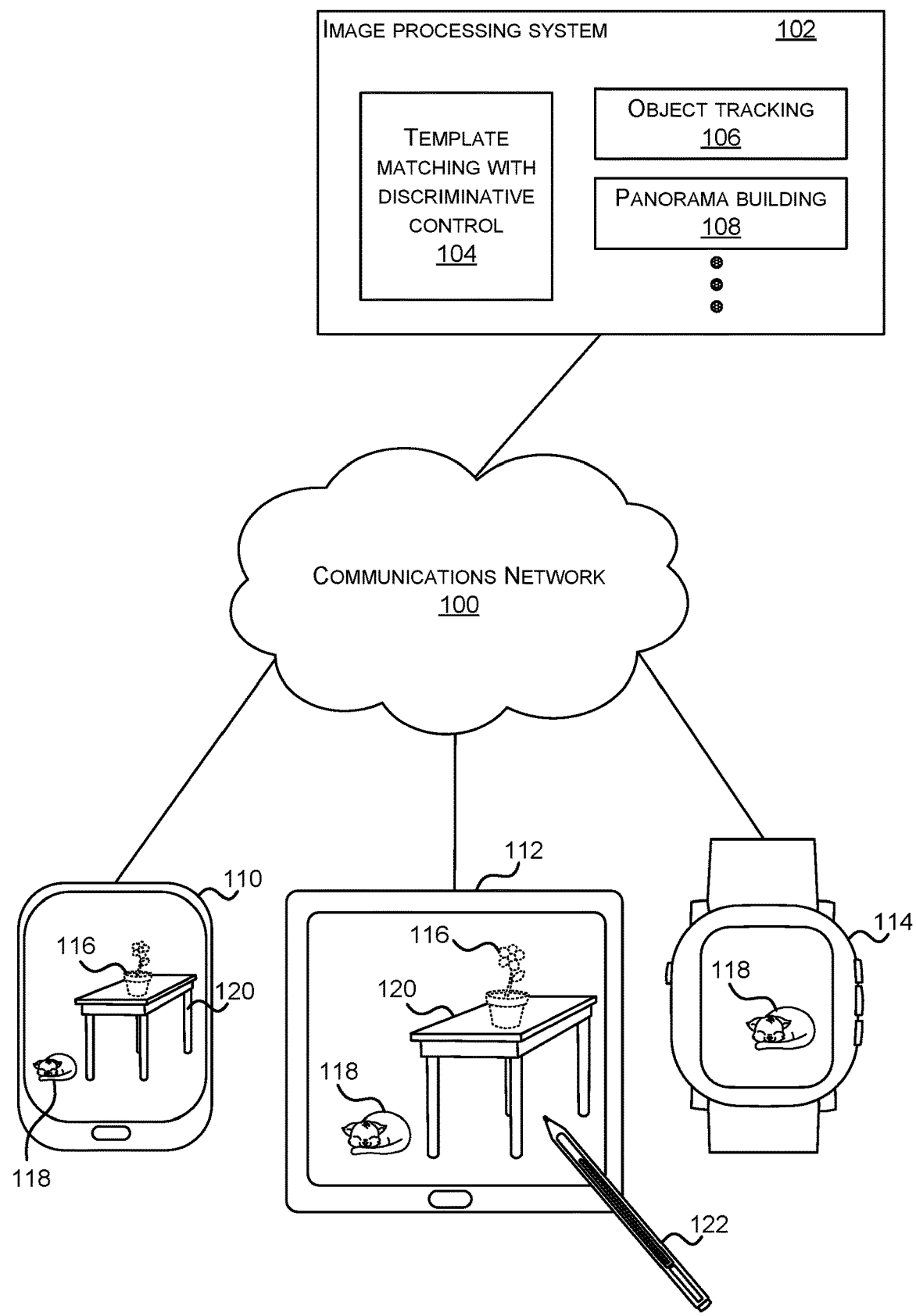
FIG. 1 is a schematic diagram of an image processing system having a template matching component with discriminative control.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above, many image processing systems incorporate a template matching process whereby a search of an image is made to find the region of the image which best matches a given template. A template is a contiguous region of image elements such as pixels or voxels and is typically smaller than the image. Template matching is useful for a variety of different image processing tasks such as tracking a moving object depicted in a video, joining photographs of different parts of a landscape to create a composite image depicting a panorama, or identifying regions to input to a stereo matching process.

As part of the search process a similarity metric is used in order to assess how similar the template is to different regions of the image. Many existing template matching systems use a similarity metric which is referred to as a normalized cross correlation function. A normalized cross correlation function is a measure of similarity of two signals as a function of displacement of one signal relative to the other, and where the signals are processed to reduce the effects of differences in average signal amplitude and variance of signal amplitude. For example, in the case where the signals are templates and images the brightness of the signals can vary due to exposure conditions or ambient lighting being different for each image and/or template. Normalization is used to reduce the effect of these differences so that the cross correlation function is able to find matching regions without being confused by differences caused by global or high level effects such as exposure and lighting conditions. The normalization acts to make the similarity metric generally independent of translations and scaling in the intensity domain.

A formal mathematical example of a normalized cross-correlation function is given later in this document.

It is recognized herein that cross correlation (without normalization) is very discriminative but also very sensitive to small intensity changes in the sensor signals. It is also recognized herein that normalized cross correlation aims to make the comparison of the cross correlation less sensitive to intensity changes, but that often the compensation is too much so that the resulting metric is not discriminative enough to perform well on template matching. Template matching systems, which use conventional normalized cross-correlation, often wrongly find multiple matching regions. It is recognized herein that this is because these types of template matching systems are not discriminative enough.

It is recognized herein that the normalization which is part of the normalized cross correlation function is intended to give robustness to differences in lighting. That is, the lighting of the scene depicted in the template may be different from the lighting of the scene depicted in the image. The normalization part of the cross correlation function can be too strong in some cases so that originally dissimilar regions become similar and are given equal or higher normalized cross correlation scores than the originally similar regions. The normalization part of the cross correlation function is designed to remove the effects of the differences between the template and the image which are caused by differences in the image capture conditions (such as lighting differences, differences in exposure time, differences in the image capture device); and this enables template matching to succeed despite such differences. However, it is recognized herein that the normalization part of the cross correlation function removes some information from the image and removes some information from the template. Removing such information makes it harder for the template matching process to be accurate, especially where the template is already similar to several regions of the image. Thus normalized cross correlation works well if there is enough unique structure within the template and image, where it is not possible to remove or compensate away that structure by subtracting the mean intensity and dividing by the standard deviation in that region, but not so well if the template and image are more uniform or have similar structure.

The present technology uses an improved similarity metric in the template matching process. The similarity metric has one or more factors which are computed from parameterized functions. The parameters take values which are determined empirically and/or are automatically computed as described in more detail below. The parameters enable the amount of normalization of the normalized cross correlation function to be controlled. This can be thought of as turning up or turning down the ability of the template matching process to discriminate between different image regions which are similar to the template. In this way a template matching component is given which is highly accurate. The template matching component is also extremely efficient and is able to compute template matching responses in real time using conventional computing hardware.

FIG. 1 is a schematic diagram of an image processing system 102 deployed at a computing device connected to a communications network 100. The image processing system 102 has a template matching component 104 with discriminative control. The image processing system optionally has an object tracking component 106 and optionally has a panorama building component 108. In some examples the image processing system 102 is provided as a cloud service accessible to electronic devices such as smart phone 110, tablet computer 112, smart watch 114 or other electronic devices via communications network 100. In some cases the image processing system 102 is deployed at an electronic device such as smart phone 110 or another type of electronic device. The image processing system 102 is distributed between an electronic device 110, 112, 114 and a computing entity connected to communications network 100 in some examples.

In the example illustrated in FIG. 1 the smart phone has a video camera (not visible in FIG. 1) which has captured a video of a scene comprising a cat 118 sitting on the floor next to a coffee table 120. A user has annotated a frame of the video by drawing, using electronic ink, a plant in a plant pot 116 on the table 120. The video has been captured by a user holding the smart phone 110 panning the smart phone camera around the room whilst the cat 118 and table 116 remain static. The image processing system 102 is used to lock the electronic ink drawing of the plant pot 116 to the coffee table 120 in the video, despite the location of the coffee table 120 varying between frames of the video. For example, FIG. 1 shows a tablet computer 112 playing the video and with a different frame of the video visible than for the smart phone 110 of FIG. 1. Although the position of the table 120 in the frame is different than the position of the table 120 in the frame of the video shown on the smart phone 110 the image processing system 102 has successfully tracked the table 120 and locked the electronic ink plant pot 116 to table 120. FIG. 1 also shows a smart watch 114 displaying another frame of the video in which the cat 118 is visible but where the table 120 is outside of the field of view. In this case the electronic ink plant pot 116 is not visible since it is locked to the table 120 and the table 120 is outside the field of view. The image processing system computes a template comprising a region of pixels depicting the surface of the table 120. The template is matched to frames of the video in order to track the surface of the table 120 and lock the electronic ink plant pot 116 to the tracked surface of the table.

Although FIG. 1 gives an example of template matching used to track an object in a video (object tracking 106) other applications of template matching are used in some cases. These include panorama building 108, stereo depth computation, noise reduction, high dynamic range (HDR) computation and others. For example, in the case of panorama building the panorama building component 108 matches templates from a first image to regions in a second image. It is then able to join the two images together along a seam through the matching templates and regions. In the case of noise reduction and/or HDR imaging, the template matching is used to find correspondences between images such as images captured using exposure bracketing. The correspondences are used to warp the images and fit them on top of one another despite any camera shake or movement between capture of the individual images. Once the images are fitted on top of one another data in the multiple images is aggregated or combined for noise reduction, high dynamic range computation or other tasks.

The image processing system 102 is computer implemented using any one or more of: software, hardware, firmware. Alternatively, or in addition, the functionality of the image processing system 102 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
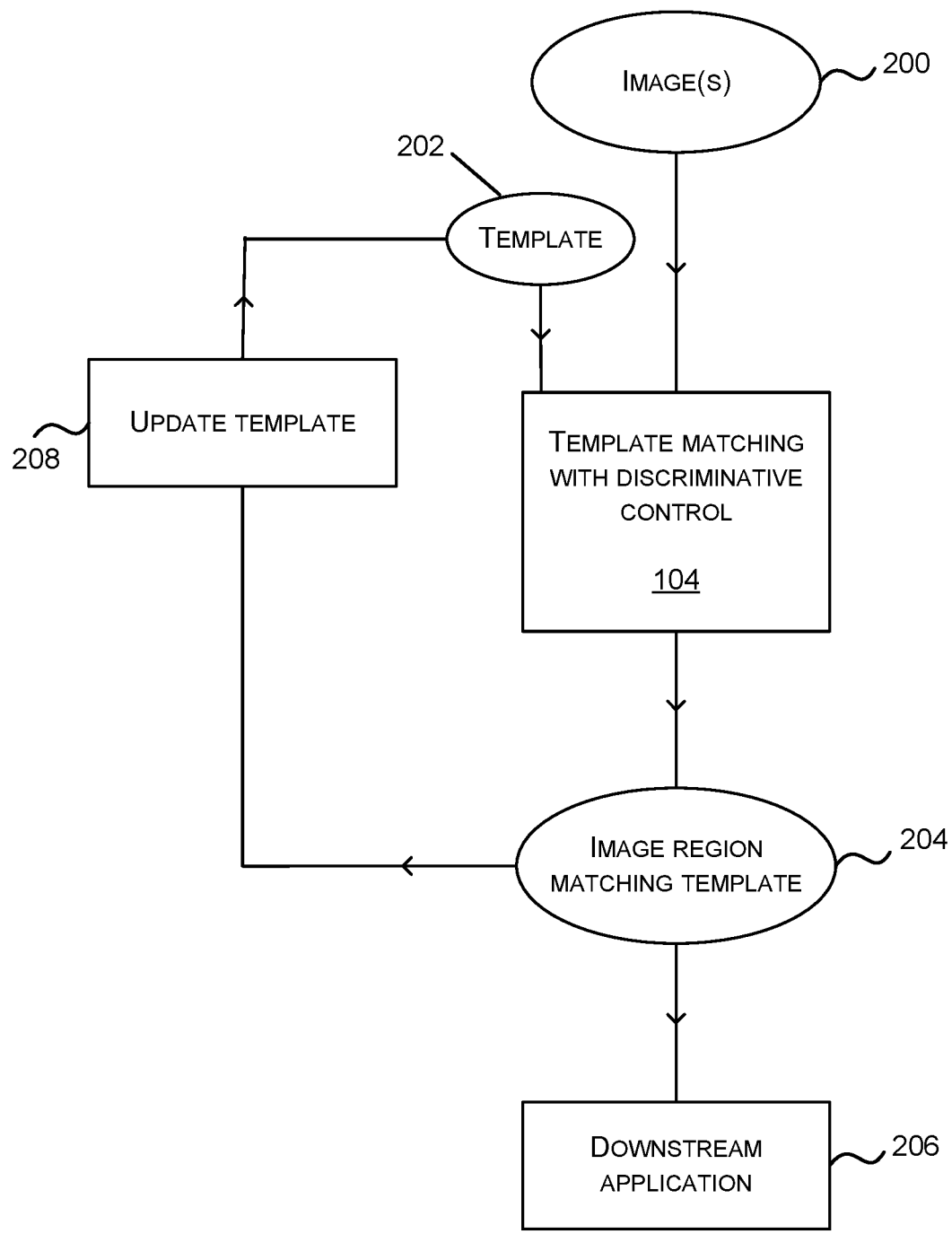
FIG. 2 is a schematic diagram of the template matching component of FIG. 1 showing inputs and outputs.

FIG. 2 is a schematic diagram of the template matching component 104 of FIG. 1 showing inputs and outputs. The inputs to the template matching component include a template 202 and one or more images 200. The template is a region of image elements such as voxels or pixels. In various examples the template is a rectangular or cuboid region but this is not essential, the template any contiguous region of image elements having a regular geometric shape or an irregular shape.

In some cases the template is automatically computed by the image processing system 102. For example, the image processing system detects an object of focus in one of the images 200 and computes a bounding box around the object of focus. The region within the bounding box is then the template. The object of focus is detected by segmenting a foreground region of the image using well known image segmentation processes. In other cases the object of focus is detected using knowledge of a focal region of an image capture device used to capture the image. In some cases the object of focus is detected using information about a gaze direction of a user detected using an eye tracker or in other ways. Combinations of one or more of these or other ways of detecting the object of focus are used in some cases.

In some cases the template is computed using user input. For example, a user selects a location in an image and a default sized template window is used centered at the location.

The one or more images 200 received at the template matching component 104 are part of a stream of images such as frames of a video or frames of a depth camera in some cases. The images may be two dimensional images or higher dimensional images such as medical image volumes.

The template matching component computes an image region 204 from one of the images 200 which is most similar to the template 202. Where a stream of images 200 is being processed, the image region 204 output by the template matching component 104 is used to update 208 the template 202. In some cases the image region 204 output by the template matching component 104 replaces the template 202. However, this can lead to compounding of errors where the image region 204 is an incorrect match to the template 202. Therefore in some cases the image region 204 is buffered and used in a later cycle of the method of FIG. 2 to update the template, when it is known that the image region 204 is likely to be accurate.

The image region 204 output by the template matching component 104 is sent or made available to a downstream application 206. The downstream application is an object tracking application in some cases which tracks a moving object depicted in a video. The downstream application is an electronic ink annotating application in some cases where electronic ink is applied to a frame of a video and is perpetuated through the whole video in a manner so that the electronic ink is locked to an object depicted in the video. The downstream application is a stereo image processing application in some cases where the template and the image region are candidate stereo match correspondences between a pair of stereo images. The downstream application is a panorama building application in some cases where the images depict different parts of the same landscape and one or more templates and matching regions are identified as suitable places to join the images.

Figure 3A:
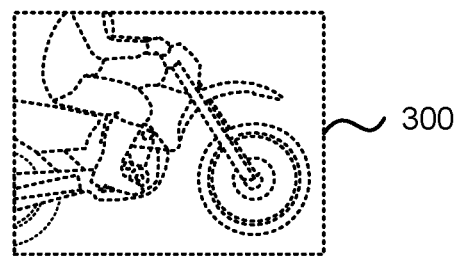
FIG. 3A is a schematic diagram of a template.

FIG. 3A is a schematic diagram of a template 300 which in this example is a rectangular template comprising pixels depicting part of a motorcycle rider. The lines in FIG. 3A are dotted to indicate that the pixels depict a blurred image of the motorcycle rider as in this example the template has been computed from a video depicting a fast moving motorcycle rider on a road with road lines and with bushes in the foreground.

Figure 3B:
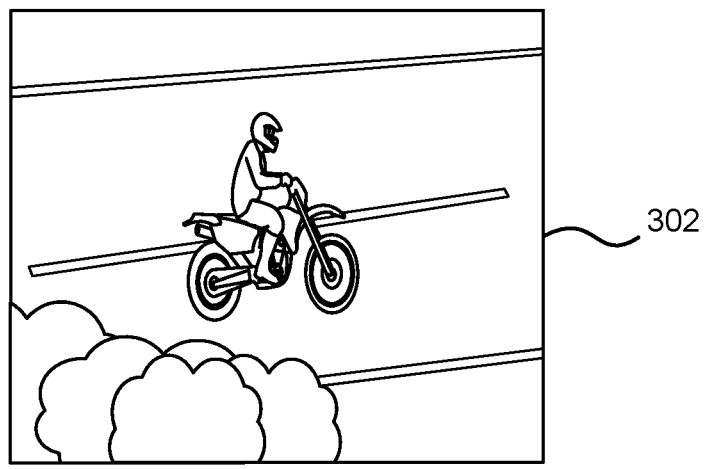
FIG. 3B is a schematic diagram of an image.

FIG. 3B is a schematic diagram of an image 302 which is a frame of the video depicting the motorcycle rider. The image 302 is represented using lines although in practice the image of the motorcycle rider is blurred (due to the movement of the motorcycle rider) so that fine detail is not depicted in the image 302.

Figure 3C:
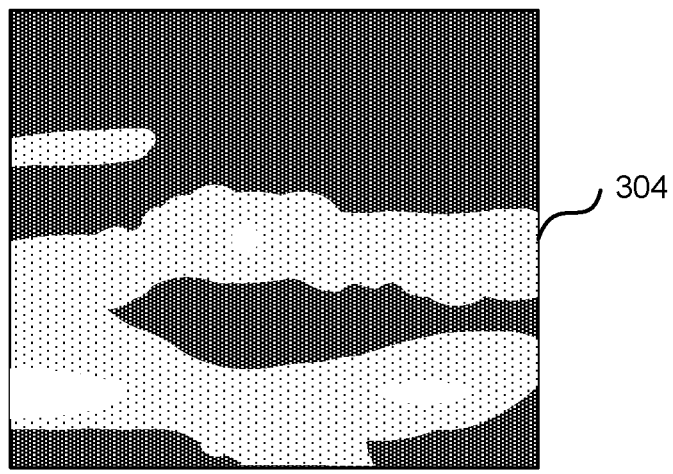
FIG. 3C is a schematic diagram of a response obtained by matching the template of FIG. 3A to the image of FIG. 3B using a similarity metric.

FIG. 3C is a schematic diagram of a response 304 computed by a template matching process when matching template 300 to image 302 and when using a conventional normalized cross correlation metric. The response 304 comprises a two dimensional array of numerical values, where there is a numerical value for each pixel of the image 302. The numerical values are the results of the normalized cross correlation metric and can be thought of as scores, one score per pixel, indicating how similar the template is to a region of the image the same size as the template and centered at the pixel. In the FIG. 3C example a lighter fill indicates pixel locations with higher scores and a darker fill indicates pixel locations with lower scores. The motorbike rider is depicted roughly in the center of image 302 and so it is expected to find a high score in the center of the response and this is the case in FIG. 3C as there is a light fill, and in some places no fill, in the center. However, there is also a light fill in several other regions including the region corresponding to the bushes depicted in the foreground of FIG. 3B. Thus several regions in the image 302 seem to match the template 300 well. As a result the template matching process is inaccurate.

Figure 3D:
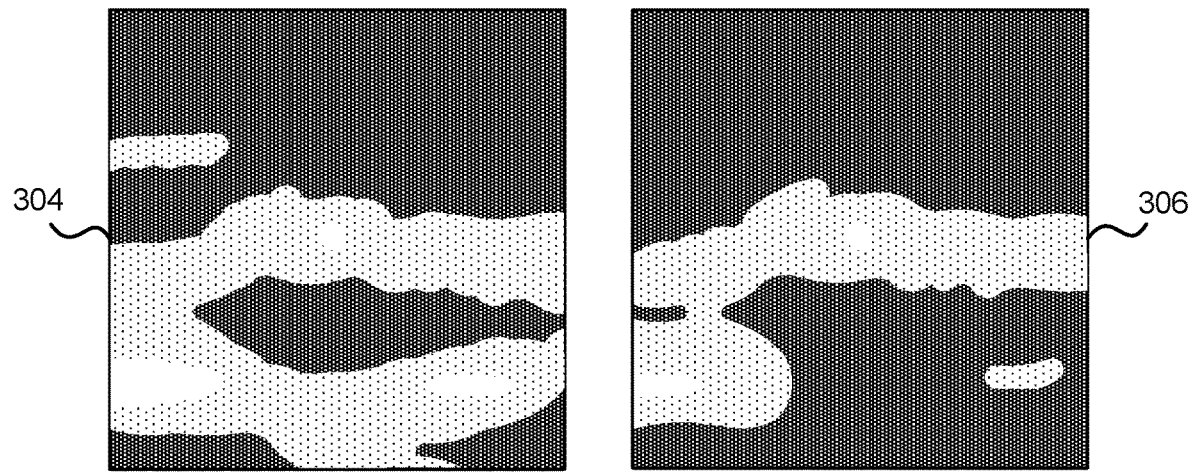
FIG. 3D has a copy of FIG. 3C together with a response obtained by matching the template of 3A to the image of FIG. 3B using a different similarity metric.

FIG. 3D shows two responses side by side. The response 304 on the left hand side is the same as the response of FIG. 3B where conventional normalized cross correlation has been used. The response 306 on the right hand side has been produced using modified normalized cross correlation as described herein. It can be seen that the correct matching region receives a high score (light fill) and there are fewer other light fill regions so that the template matching process is more accurate.

Figure 3E:
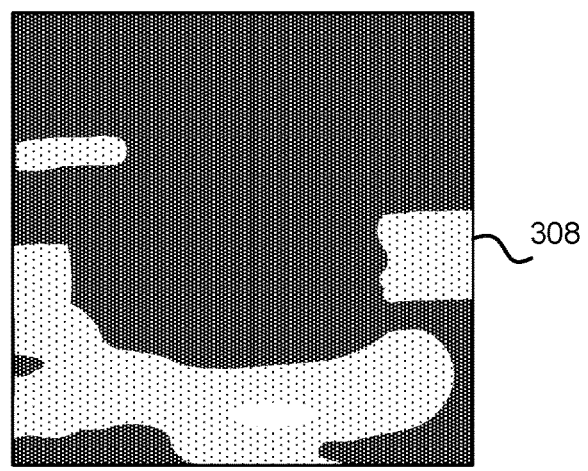
FIG. 3E is a schematic diagram of a difference between the responses of FIG. 3D.

FIG. 3E shows the result of subtracting response 306 from response 304. This shows there are significant differences in the response produced by the conventional process and the processes described herein.

In various examples the similarity metric comprises a normalized cross correlation function which is modified to include at least one factor related to a statistic of both the template and the second image. The factor influences how much discriminative ability the template matching process has. For example, the factor acts to penalize differences between the statistic of the template and the image so that if there are differences the similarity metric is lower. The statistic is a mean of an image quantity, or a standard deviation of an image quantity in some cases. The image quantity is intensity or another image quantity such as texture.

In some cases the at least one factor is computed as a function of the statistic of the template and the statistic of the image, and the function is parameterized as described in more detail below. In some cases the function is parameterized by two parameters, at first one of the parameters controlling a range within which the function produces the value one, and a second one of the parameters controlling a rate at which the function produces a value smaller than one and moving towards zero. This is described in more detail below with reference to FIGS. 5A and 5B. In some cases more than one factor is used and the factors are computed from parameterized functions.

Figure 4:
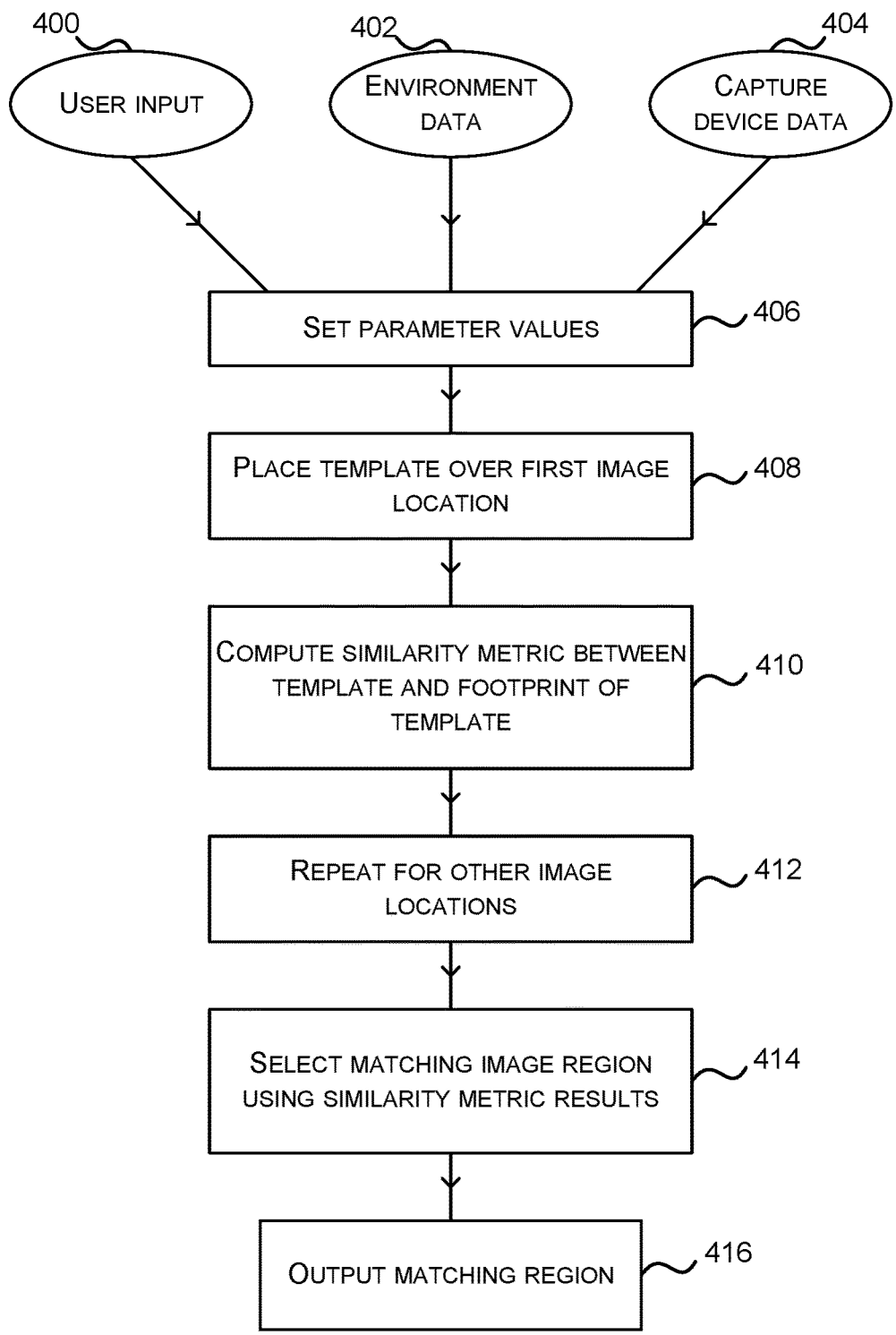
FIG. 4 is a flow diagram of a method carried out at the template matching component of FIG. 1.

FIG. 4 is a flow diagram of a method of operation at the template matching component. In an optional operation, parameter values are set 406 and these are values of parameters used by the similarity metric. In some cases the values of the parameters are hard coded into the template matching component 104 in which case they are not set during operation of the process of FIG. 4. For example, the values of the parameters are selected through empirical testing and configured by an operator during manufacture of the template matching component 104.

In some cases the values of the parameters are computed by the template matching component 104 itself using data from one or more sources. Sources of information which may be used alone or in any combination include: user input 400, environment data 402 and capture device data 404. In the case of user input 400 a user is able to set the values of the parameters by selecting a value or a range of values in any suitable manner. In the case of environment data 402 the template matching component 104 has access to data about the environment in which the images 200 and/or template 202 were captured. A non-exhaustive list of examples of environment data is: light sensor data, accelerometer data, vibration sensor data. In the case of capture device data 404 the template matching component 104 has access to data about one or more capture devices used to capture images 200 and/or template 202. A non-exhaustive list of examples of capture device data 404 is: exposure setting, focus setting, camera flash data, camera parameters, camera light sensor data.

Where the template matching component 104 uses environment data 402 and/or capture device data 404 to set the parameter values it uses rules, thresholds or criteria to compute the parameter values from the data. For example, where the environment data 402 is similar for the image and for the template the parameter values are set so that the normalization is "turned down" and the discriminative ability of the template matching component is "turned up". For example, where the environment data 402 is different by more than a threshold amount for the image and the template, the parameter values are set so that the normalization is "turned up" and the discriminative ability is "turned down".

In some examples the parameter values are set by taking into account feedback from the template matching system. For example, template matching results are observed. If the results are ambiguous the penalty is increased. If too few matches are found the penalty is decreased. In order to increase the penalty the values of the parameters are reduced. In order to decrease the penalty the values of the parameters are increased.

The template is placed 408 over a first image location such as the top left image element (pixel or voxel) of the image 200. The template is compared with the image elements of the image which are in the footprint of the template. The comparison comprises computing 410 the modified normalized cross correlation metric. The resulting numerical value may be stored in a location of the response array which corresponds to the location of the first image element. The template is then moved to the next image location such as the next image element of the row and the process repeats 412 for the remaining image locations (such as all pixels or voxels of the image). A matching region of the image is then selected 414 by assessing the values in the response array. The matching image region is then output 416 as described with reference to FIG. 2.

In some examples the process of FIG. 4 is modified to achieve efficiencies so that fewer computing resources are needed and/or so that the process is operable in real time using conventional computer hardware such as a smart phone or tablet computer. The template and the image are converted into the frequency domain by computing a Fourier transform of both the template and the image. The Fourier transformed template is then multiplied with the Fourier transformed image (after normalization of both) in order to compute the similarity metric. The results of the multiplication are transformed using a reverse Fourier transform to give results in the spatial domain. A peak analysis is then done to find the optimal scoring image element location and thus the region in the image which optimally matches the template.

A mathematical definition of conventional normalized cross correlation for template matching is now given:

The template is normalized by computing a mean intensity of the image elements of the template (denoted $\mu_T$) and subtracting the mean $\mu T$ from each image element of the template and this is expressed mathematically as:

$$T'(x', y') = T(x', y') - \frac{1}{w \times h} \times \sum_{x'',y''} T(x'', y'') = T(x', y') - \mu_T$$

Which is expressed in words as, the normalized value of the intensity of the template at image element location x,y is denoted T'(x',y') and is equal to the intensity at that image element location of the original template T minus one divided by the width w times the height h of the template time the sum over all the image element locations of the template which is equal to the intensity of the value at the image element location of the original template minus the average intensity value of the image elements of the original template.

The part of the image being compared with the template (referred to herein as a candidate image region) is then normalized. This comprises subtracting the candidate image region, under the sliding template, by its mean $\mu_I$:

$$I'(x+x', y+y') = I(x+x', y+y') - \frac{1}{w \times h} \times \sum_{x'',y''} I(x+x'', y+y'')$$
$$= I(x+x', y+y') - \mu_I(x, y)$$

Which is expressed in words as the normalized intensity I' of the image element of the candidate image region is equal to the original intensity of that image element minus the average of the intensities of the image elements in the candidate image region.

The response (result of the cross correlation computation) at the image element location (x,y) is normalized with the standard deviation of the intensities of the normalized template T' and the normalized image region I' and this is expressed formally as:

$$R(x, y) = \frac{\sum_{x',y'} (T'(x', y') \times I'(x+x', y+y'))}{\sqrt{\sum_{x',y'} T'(x', y')^2 \times \sum_{x',y'} I'(x+x', y+y')^2}}$$

-continued $$= \frac{\sum_{x',y'} (T'(x', y') \times I'(x + x', y + y'))}{\sigma_T \times \sigma_I(x, y)}$$

Where $\sigma_T$ denotes the standard deviation of a quantity of the image elements of the template and $\sigma_I$ denotes the standard deviation of a quantity of the image elements of the candidate image region.

In an example, the modified normalized cross correlation includes two factors denoted $f(\sigma_T, \sigma_I)$ and $g(\mu_T, \mu_I)$. However, it is possible to use only one of these factors.

Expressed formally, the response R'(x, y) at image element location x,y in the case of modified normalized cross correlation is equal to the factors times the response R(x, y) at image element location x,y in the case of conventional normalized cross correlation:

$$R'(x, y) = f(\sigma_T, \sigma_I) g(\mu_T, \mu_I) \times R(x, y)$$

This gives explicit control over the drawbacks of the conventional normalized cross correlation. The conventional normalized cross correlation metric is computed and then multiplied by the one or more factors. In some examples the factors are numerical values computed from parameterized functions. A huge variety of functions may be used and examples are discussed with reference to FIGS. 5A and 5B. In various examples, the one or more factors are related to a comparison of standard deviation of an image quality of the template and standard deviation of the image quality of the region of the image under the template. As these standard deviation values are computed as part of computation of convention normalized cross correlation, they are re-used and this gives added efficiencies. In various examples, the one or more factors are related to a comparison of the mean of an image quality of the template and a mean of the image quality of the region of the image under the template. As these mean values are computed as part of computation of conventional normalized cross correlation, they are re-used and this gives added efficiencies.

Proposed functions include:

$$f(\sigma_T, \sigma_I) = e^{-u^2/(2 \times k_a^2)}$$

where $$u = \max\left(\max\left(\frac{\sigma_T}{\sigma_I}, \frac{\sigma_I}{\sigma_T}\right) - k_b, 0\right)$$

With $k_a$ and $k_b$ as parameters. In this case, the factor, given the standard deviation of the template and the standard deviation of the candidate image region is equal to e to the negative power of the ratio of u squared to two times the parameter $k_a$ squared. The symbol u denotes either zero or the difference between the maximum of the ratio of the standard deviation of the template to the standard deviation of the candidate image region, and the inverse of that ratio, after the subtracting the parameter $k_b$.

And for g:

$$g(\mu_T, \mu_I) = e^{-v^2/(2 \times k_c^2)}$$

Where $$v = \max(\text{abs}(\mu_T - \mu_I) - k_d, 0)$$

With $k_c$ and $k_d$ as parameters. In this case, the factor g, given the mean of the template and the mean of the candidate image region is equal to e to the negative power of v squared divided by two times the parameter $k_c$ squared. The symbol v denotes either zero or the absolute difference between the mean of the template and the mean of the candidate image region, minus the parameter $k_d$, whichever is larger.

Figure 5A:
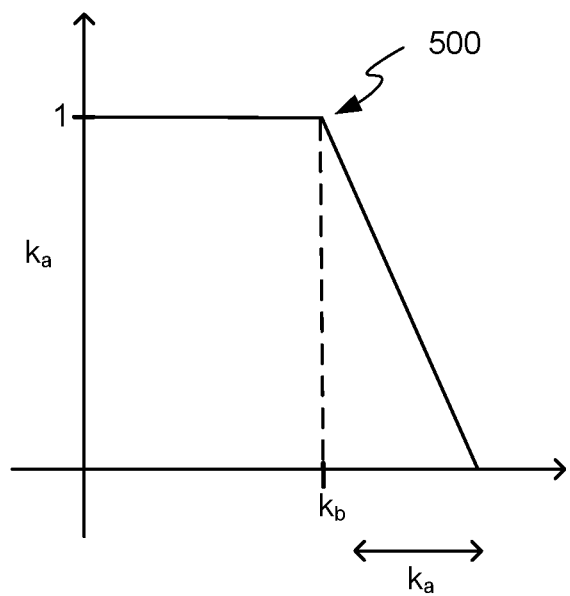
FIG. 5A is a graph of a first function of parameters $k_a$ and $k_b$.
Figure 5B:
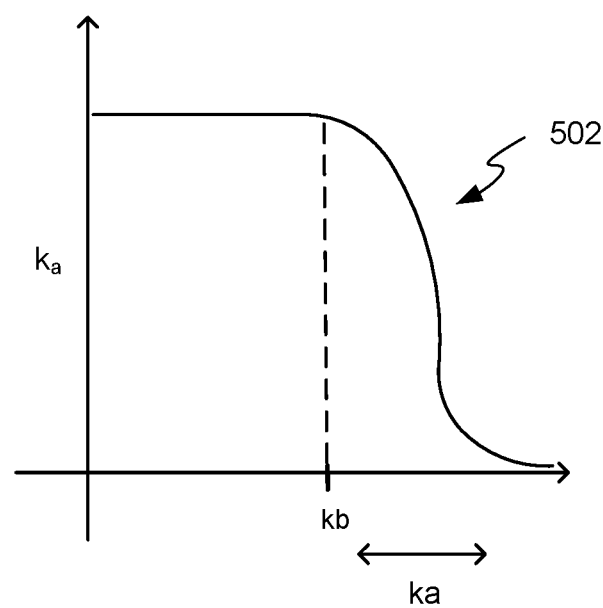
FIG. 5B is a graph of a second function of parameters $k_a$ and $k_b$.

As illustrated in FIG. 5A the function 500 returns the value one and thus gives the same result as the conventional normalized cross correlation in a range according to the magnitude of the parameter kb. The function f returns values increasingly less than one and closer to zero according to a rate controlled by the magnitude of the parameter $k_a$. The particular form of the function may vary according to the application domain concerned. Two examples of possible forms are given in FIG. 5A 500 and FIG. 5B 502 although these are not intended to limit the scope of protection.

Figure 6:
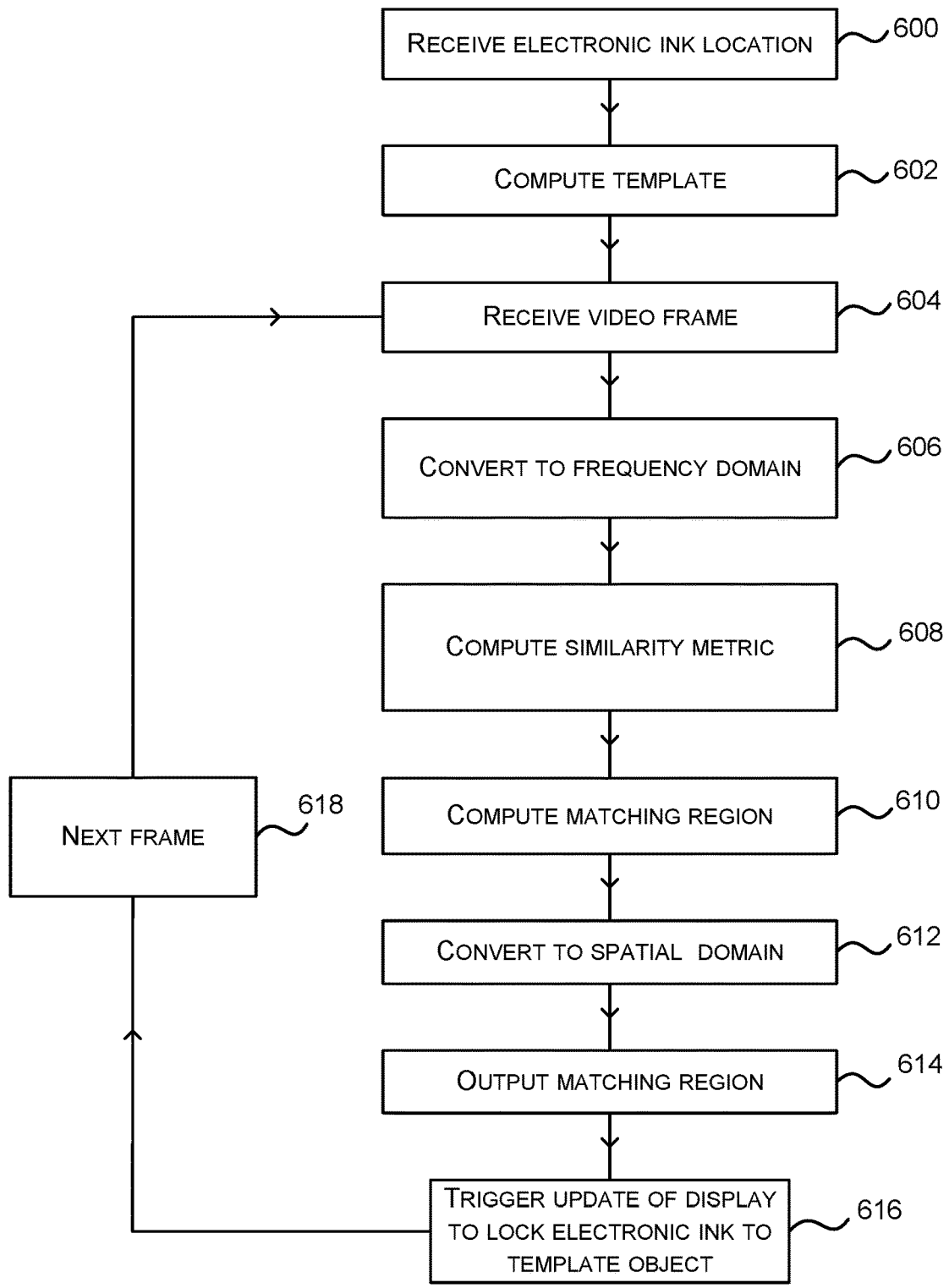
FIG. 6 is a flow diagram of a method of locking electronic ink to a moving object depicted in a video.

An example in which the template matching component is used as part of an application to lock electronic ink annotations onto objects depicted in videos is now described with reference to FIG. 6. The image processing system 102 receives 600 a location of an electronic ink annotation in a frame of the video. For example, the image processing system receives input from an operating system of a touch event at a touch screen of an electronic device at which the video frame is displayed and where a user annotates the frame using a stylus or finger to draw the electronic ink. The template matching component computes a template 602 as described above with reference to FIG. 2. The template matching component receives a video frame 604 of the video and converts the video frame and the template to a frequency domain 606 by computing Fourier transforms. The template matching component computes the modified normalized cross correlation metric 608 described herein and computes the matching region. The template matching component converts the matching region to the spatial domain by computing a reverse Fourier transform and outputs the matching region 614. The template matching component then triggers 616 update of the display in order to lock the electronic ink to the object depicted in or adjacent to the template.

The process of FIG. 6 then repeats for the next frame of the video 618 after having updated the template if appropriate, as described with reference to FIG. 4.

Figure 7:
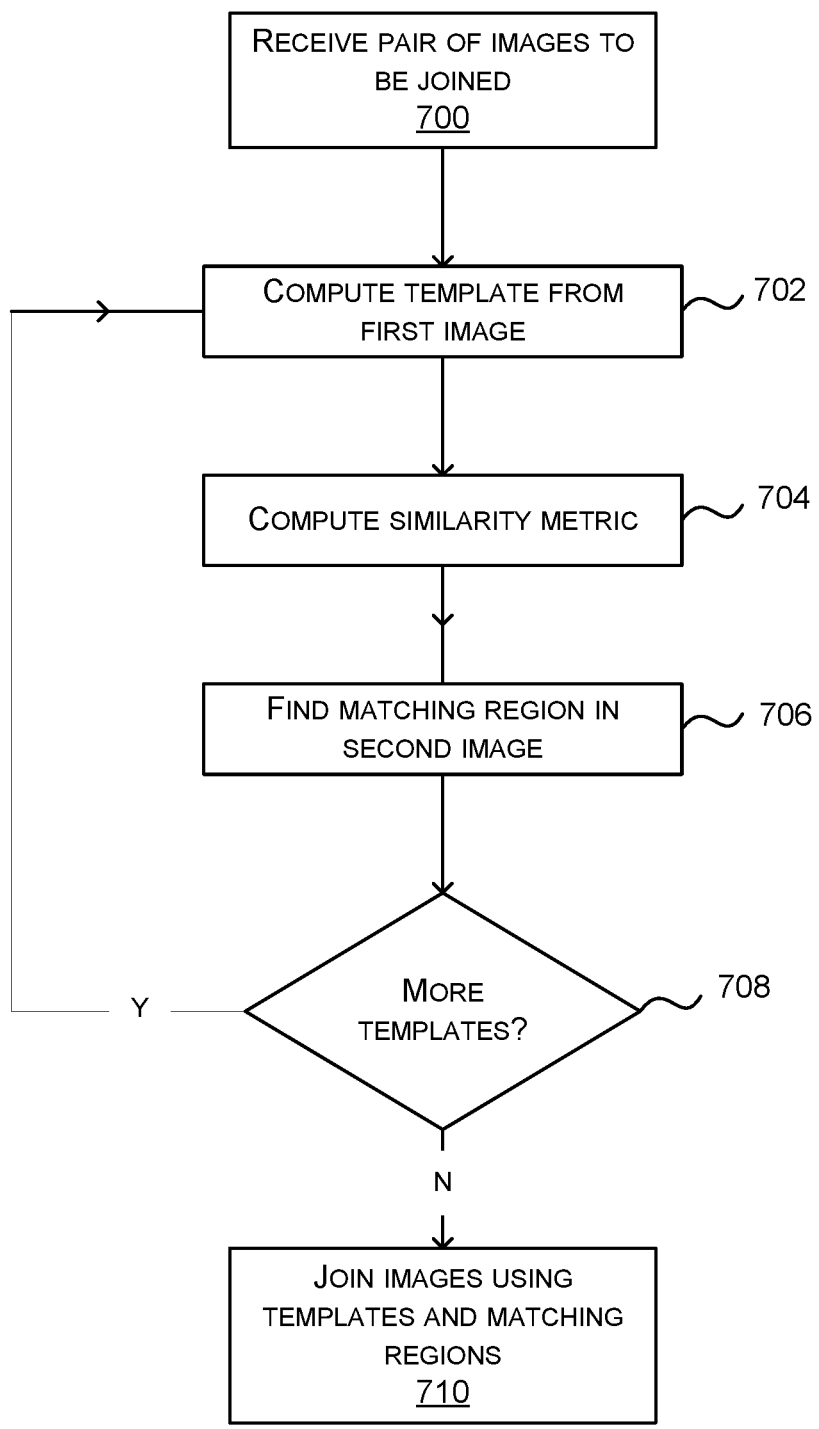
FIG. 7 is a flow diagram of a method of joining a pair of images using the template matching component of FIG. 1.

An example in which the template matching component is used as part of an application to build a composite image from a pair of images is now described with reference to FIG. 7. The image processing system receives 700 a pair of images to be joined. For example, these are an image depicting a seascape to the viewer's left and an image depicting the same seascape to the viewer's center and right. The template matching component computes 702 a template from the first image such as the seascape of the left view. It computes 704 the similarity metric (either in the frequency domain or not) and finds 706 a matching region in the second image. The image processing system decides 708 whether more templates are to be found and if so, it repeats the process of operations 702 to 706. If no further templates are to be found the image processing system proceeds to join the images 710 using the templates and their matching regions. Each template and its matching region are places at which the two images are to be joined and together a seam is formed between the templates and matching regions. In this way a composite image is produced which depicts the complete seascape.

Figure 8:
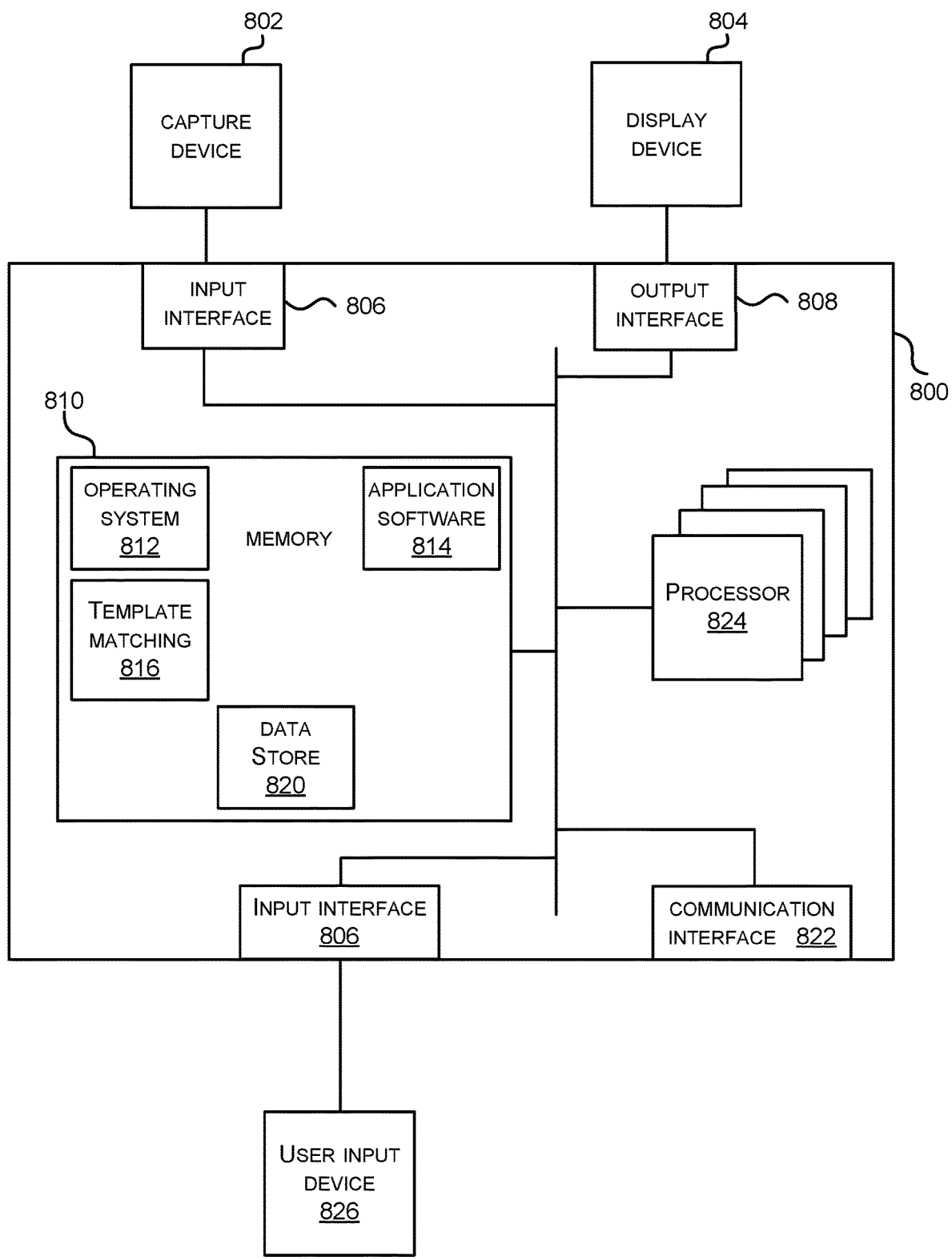
FIG. 8 illustrates an exemplary computing-based device in which embodiments of an image processing system are implemented.

FIG. 8 illustrates various components of an exemplary computing-based device 800 which are implemented as any form of a computing and/or electronic device, and in which embodiments of an image processing with a template matching facility are implemented in some examples.

Computing-based device 800 comprises one or more processors 824 which are microprocessors, controllers or any other suitable type of processors for processing computer executable instructions to control the operation of the device in order to carry out image processing with template matching that has discriminative control. In some examples, for example where a system on a chip architecture is used, the processors 824 include one or more fixed function blocks (also referred to as accelerators) which implement a part of the method of any of FIGS. 4 and 6 to 7 in hardware (rather than software or firmware). A template matching component 816 at the computing-based device is able to match a template to an image as described herein. A data store 820 holds images, computed responses, parameter values, similarity metrics and other data. Platform software comprising an operating system 812 or any other suitable platform software is provided at the computing-based device to enable application software 814 to be executed on the device.

The computer executable instructions are provided using any computer-readable media that is accessible by computing based device 800. Computer-readable media includes, for example, computer storage media such as memory 810 and communications media. Computer storage media, such as memory 810, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 810) is shown within the computing-based device 800 it will be appreciated that the storage is, in some examples, distributed or located remotely and accessed via a network or other communication link (e.g. using communication interface 822).

The computing-based device 800 also comprises an input interface 806 which receives inputs from a capture device 802 such as a video camera, depth camera, color camera, web camera or other capture device 802. The input interface 806 also receives input from one or more user input devices 826. The computing-based device 800 comprises a an output interface 808 arranged to output display information to a display device 804 which may be separate from or integral to the computing-based device 800. A non-exhaustive list of examples of user input device 826 is: a mouse, keyboard, camera, microphone or other sensor. In some examples the user input device 826 detects voice input, user gestures or other user actions and provides a natural user interface (NUI). This user input may be used to change values of parameters, view responses computed using similarity metrics, specify templates, view images, draw electronic ink on an image, specify images to be joined and for other purposes. In an embodiment the display device 804 also acts as the user input device 826 if it is a touch sensitive display device. The output interface 808 outputs data to devices other than the display device in some examples, e.g. a locally connected printing device (not shown in FIG. 8).

Any of the input interface 806, the output interface 808, display device 804 and the user input device 826 may comprise natural user interface technology which enables a user to interact with the computing-based device in a natural manner, free from artificial constraints imposed by input devices such as mice, keyboards, remote controls and the like. Examples of natural user interface technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of natural user interface technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

An image processing apparatus comprising:

a processor configured to access a template of image elements;

the processor being configured to search an image which is larger than the template to find a region which is similar to the template, where similarity is measured using a similarity metric; and wherein the similarity metric comprises a normalized cross correlation function which is modified to include at least one factor related to a statistic of both the template and the region. This enables explicit control of discriminative ability of the template matching through the use of the factor.

The image processing apparatus described above wherein the factor acts to penalise differences between the statistic of the template and the image. This enables improved accuracy as compared with conventional normalized cross correlation template matching.

The image processing apparatus described above wherein the statistic is a mean of an image quantity, or a standard deviation of an image quantity. These statistics are computed already for the normalized cross correlation process and are reused for the modified similarity metric giving significant efficiencies.

The image processing apparatus described above wherein the at least one factor is computed as a function of the statistic of the template and the statistic of the region, and wherein the function is parameterized. By using parameterized functions it is possible to set the parameter values to appropriately control the functioning of the image processing apparatus.

The image processing apparatus described above wherein the function is parameterized by two parameters, at first one of the parameters controlling a range within which the function produces the value one, and a second one of the parameters controlling a rate at which the function produces a value smaller than one and moving towards zero.

The image processing apparatus described above wherein values of the parameters of the function are dynamically adjusted by the image processing apparatus. By dynamic adjustment of the parameter values significant improvements in accuracy are obtained without increasing computational requirements unduly.

The image processing apparatus described above wherein the dynamic adjustment is made according to one or more of: user input, sensed data, metadata of the template, metadata of the image.

The image processing apparatus described above wherein the normalized cross correlation function is modified to include a second factor related to a second statistic of both the template and the region.

The image processing apparatus described above wherein the second factor is computed as a function of the second statistic of the template and the second statistic of the image, and wherein the function is parameterized.

The image processing apparatus described above wherein the function of the second statistic is parameterized by two parameters, at first one of the parameters controlling a range within which the function produces the value one, and a second one of the parameters controlling a rate at which the function produces a value smaller than one and moving towards zero The image processing apparatus described above wherein values of the parameters of the function of the second statistic are dynamically adjusted by the image processing apparatus.

The image processing apparatus described above wherein the dynamic adjustment is made according to one or more of: user input, sensed data, metadata of the template, metadata of the image.

The image processing apparatus described above wherein the similarity metric is computed after conversion of the template and the image to the frequency domain.

The image processing apparatus described above comprising computing the template from a first image by computing a region of the first image which is associated with electronic ink applied to the first image.

The image processing apparatus described above wherein the processor is configured to trigger update of a display to lock the electronic ink to the template.

The image processing apparatus described above comprising computing the template from a first image by computing a region of the first image depicting a moving object.

The image processing apparatus described above wherein the processor is configured to join the image to a first image using the template and the region.

A computer-implemented method of template matching comprising:
receiving a template of image elements;
searching an image to find a region which is similar to the template, where similarity is measured using a similarity metric;
wherein the similarity metric comprises a normalized cross correlation function which is modified to include a factor related to a comparison of the region and the template.

The method described above where the comparison is a difference or where the comparison is a ratio.

One or more tangible device-readable media with device-executable instructions that, when executed by a computing system, direct the computing system to perform operations comprising:
receiving a template of image elements;
searching an image to find a region which is similar to the template, where similarity is measured using a similarity metric;
wherein the similarity metric comprises a normalized cross correlation function which is modified to include at least one factor related to a comparison of the region and the template.

An image processing system comprising:
means for receiving a template of image elements; and
means for searching an image to find a region which is similar to the template, where similarity is measured using a similarity metric;
wherein the similarity metric comprises a normalized cross correlation function which is modified to include a factor related to a comparison of the region and the template. For example, the means for receiving a template is the memory 810 or processor 824 or a combination of the memory 810 and processor 824. For example, the means for searching is the template matching component 104 when configured to carry out the operation of all or part of the method of FIG. 4.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An image processing apparatus comprising:
   a processor configured to access a template of image elements;
   the processor being configured to search an image which is larger than the template to find a region of the image which is similar to the template, where similarity is measured using a similarity metric; and
   wherein the similarity metric comprises a normalized cross correlation function which is modified to include at least one factor related to a statistic of both the template and the region, wherein the at least one factor is computed as a function that is parameterized.

2. The image processing apparatus of claim 1 wherein the at least one factor acts to penalise differences between the statistic of the template and the region.

3. The image processing apparatus of claim 1 wherein the statistic is a mean of an image quantity.

4. The image processing apparatus of claim 1 wherein the statistic is a standard deviation of an image quantity.

5. The image processing apparatus of claim 1 wherein the function is parameterized by two parameters, at first one of the parameters controlling a range within which the function produces a value one, and a second one of the parameters controlling a rate at which the function produces a value smaller than one and moving towards zero.

6. The image processing apparatus of claim 4 wherein values of the function are dynamically adjusted by the image processing apparatus.

7. The image processing apparatus of claim 6 wherein the dynamic adjustment is made according to one or more of: user input, sensed data, metadata of the template, metadata of the image.

8. The image processing apparatus of claim 1 wherein the normalized cross correlation function is modified to include a second factor related to a second statistic of both the template and the region.

9. The image processing apparatus of claim 8 wherein the second factor is computed as a function of the second statistic of the template and the second statistic of the image, and wherein the function is parameterized.

10. The image processing apparatus of claim 9 wherein values of the parameters of the function of the second statistic are dynamically adjusted by the image processing apparatus.

11. The image processing apparatus of claim 10 wherein the dynamic adjustment is made according to one or more of: user input, sensed data, metadata of the template, metadata of the image.

12. The image processing apparatus of claim 10 wherein the function of the second statistic is parameterized by two parameters, at first one of the parameters controlling a range within which the function produces value one, and a second one of the parameters controlling a rate at which the function produces a value smaller than one and moving towards zero.

13. The image processing apparatus of claim 1 wherein the similarity metric is computed after conversion of the template and the image to a frequency domain.

14. The image processing apparatus of claim 1 comprising computing the template from a first image by computing a region of the first image which is associated with electronic ink applied to the first image.

15. The image processing apparatus of claim 14 wherein the processor is configured to trigger update of a display to lock the electronic ink to the template.

16. The image processing apparatus of claim 1 comprising computing the template from a first image by computing a region of the first image depicting a moving object.

17. The image processing apparatus of claim 1 wherein the processor is configured to join the image to a first image using the template and the region.

18. A computer-implemented method of template matching comprising:
    receiving a template of image elements; and
    searching an image that is larger than the template to find a region of the image which is similar to the template, where similarity is measured using a similarity metric;
    wherein the similarity metric comprises a normalized cross correlation function which is modified to include a factor related to a statistic of both the region and the template, wherein the factor is computed as a function that is parameterized.

19. The method of claim 18 where the comparison is a difference or where the comparison is a ratio.

20. One or more computer-readable storage devices with device-executable instructions that, when executed by a computing system, direct the computing system to perform operations comprising:
    receiving a template of image elements; and
    searching an image that is larger than the template to find a region of the image which is similar to the template, where similarity is measured using a similarity metric;

wherein the similarity metric comprises a normalized cross correlation function which is modified to include at least one factor related to a statistic of both the region and the template, wherein the at least one factor is computed as a function that is parameterized.

\* \* \* \* \*